(12) United States Patent
Ishikawa

(10) Patent No.: US 8,419,583 B2
(45) Date of Patent: Apr. 16, 2013

(54) FRONT DIFFERENTIAL FOR A VEHICLE

(75) Inventor: Shinichiro Ishikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 478 days.

(21) Appl. No.: 12/716,493

(22) Filed: Mar. 3, 2010

(65) Prior Publication Data
US 2010/0261569 A1 Oct. 14, 2010

(30) Foreign Application Priority Data
Apr. 9, 2009 (JP) ................. 2009-094918

(51) Int. Cl.
*F16H 48/061* (2006.01)

(52) U.S. Cl.
USPC ........................................ 475/230

(58) Field of Classification Search .......... 475/221, 475/200, 202, 231, 234, 235, 241, 240; 180/248
See application file for complete search history.

(56) References Cited

U.S. PATENT DOCUMENTS

| | | | | |
|---|---|---|---|---|
| 3,224,299 A * | 12/1965 | Holdeman et al. | ............ | 475/235 |
| 3,400,611 A * | 9/1968 | Engle | ............ | 475/235 |
| 3,402,796 A * | 9/1968 | Mieras | ............ | 192/107 R |
| 3,489,038 A * | 1/1970 | Roper | ............ | 475/87 |
| 3,527,120 A * | 9/1970 | Duer et al. | ............ | 475/235 |
| 4,612,825 A * | 9/1986 | Engle | ............ | 475/235 |
| 5,139,467 A * | 8/1992 | Carpenter | ............ | 475/235 |
| 6,554,733 B2 * | 4/2003 | Niebauer | ............ | 475/230 |
| 7,223,192 B2 * | 5/2007 | Kashiwazaki | ............ | 475/230 |
| 7,270,026 B2 * | 9/2007 | Atkinson et al. | ............ | 74/424 |
| 2009/0076696 A1* | 3/2009 | Perkins et al. | ............ | 701/69 |
| 2009/0181820 A1* | 7/2009 | Homan | ............ | 475/235 |

FOREIGN PATENT DOCUMENTS

| | | |
|---|---|---|
| JP | 47032338 Y | 9/1972 |
| JP | 61116151 A | 6/1986 |
| JP | 61112154 | 7/1986 |
| JP | 07034248 U | 6/1995 |
| JP | 11022809 A | 1/1999 |
| JP | 2000110917 A | 4/2000 |
| JP | 2001074123 A | 3/2001 |
| JP | 2001141031 A | 5/2001 |
| JP | 2005024034 A | 1/2005 |
| JP | 3928778 Y | 6/2007 |

\* cited by examiner

*Primary Examiner* — Roger Pang
(74) *Attorney, Agent, or Firm* — Gifford, Krass, Sprinkle, Anderson & Citkowski, P.C.

(57) ABSTRACT

A front differential for a four wheel drive vehicle, includes: a switching mechanism that switches the vehicle between rear-wheel drive and front- and rear-wheel drive by selectively interrupting or allowing the transmission of power between one of a pair of side gears and one of a pair of front wheels; and an urging mechanism that urges at least one of the pair of side gears in a drive shaft axial direction toward at least one of the front wheels.

14 Claims, 5 Drawing Sheets

US 8,419,583 B2

FRONT DIFFERENTIAL FOR A VEHICLE

INCORPORATION BY REFERENCE

The disclosure of Japanese Patent Application No. 2009-94918 filed on Apr. 9, 2009 including the specification, drawings and abstract is incorporated herein by reference in its entirety.

BACKGROUND OF THE INVENTION

1. Field of the Invention

The invention relates to a differential. More particularly, the invention relates to a front differential in a vehicle that is capable of switching between rear-wheel drive and front- and rear-wheel drive.

2. Description of the Related Art

A differential for a vehicle is widely used. This differential distributes driving force input from an input shaft to left and right driving wheels. Differential operation of the unit enables the left and right wheels to rotate at different speeds. Japanese Utility Model Application Publication No. 61-112154 (JP-U-61-112154) describes one example of a front differential.

Incidentally, some vehicles such as pickup trucks and SUVs (Sport Utility Vehicles) are provided with an ADD unit (Automatic Disconnecting Differential) for the front differential because these vehicles run switching between rear-wheel drive and front- and rear-wheel drive. This ADD unit can place the vehicle in rear-wheel drive by interrupting the drive transmission path between one side gear of the front differential and the left or right front wheel that corresponds to that side gear.

When the ADD unit places the vehicle in rear-wheel drive, there is no disengaging load between the pinion gear and the side gear of the front differential, so it does not help to support the drive shaft. That is, the drive shaft is supported only by the engaged portion in the front differential so the drive shaft ends up leaning. As a result, the side gear also ends up leaning, which may cause misalignment. Also, when the vehicle is in rear-wheel drive, the front differential is constantly in a differential state so the pinion gear that is in mesh with the side gears rotates (i.e., spins) and revolves as the side gears rotate, producing noise and vibration from gear mesh. What is more, if misalignment occurs, the vibratory force from the meshing of the gears will adversely affect the front differential gear unit greatly.

SUMMARY OF THE INVENTION

The invention thus provides a front differential for a vehicle capable of suppressing abnormal noise and vibration while no torque is being transmitted.

A first aspect of the invention relates to a front differential for a four wheel drive vehicle. This front differential includes a switching mechanism that switches the vehicle between rear-wheel drive and front- and rear-wheel drive by selectively interrupting or allowing the transmission of power between one of a pair of side gears and one of a pair of front wheels, and an urging mechanism that urges at least one of the pair of side gears in a drive shaft axial direction toward at least one of the front wheels.

According to this aspect, at least one of the pair of side gears is urged by the urging mechanism in the axial direction of the drive shaft toward at least one of the front wheels. Therefore, even if the vehicle is placed in rear-wheel drive by the switching mechanism, abnormal noise and vibration in the front differential are able to be suppressed.

A second aspect of the invention relates to a front differential for a four wheel drive vehicle. This front differential includes a switching mechanism that switches the vehicle between rear-wheel drive and front- and rear-wheel drive by selectively interrupting or allowing the transmission of power between one of a pair of side gears and one of a pair of front wheels, and an urging mechanism that urges at least one of the pair of side gears in a drive shaft axial direction of an inner wall surface of a differential case toward a front wheel that corresponds to the respective side gear.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Example embodiments of the present invention will be described in greater detail below with reference to the accompanying drawings.

Figure 1:
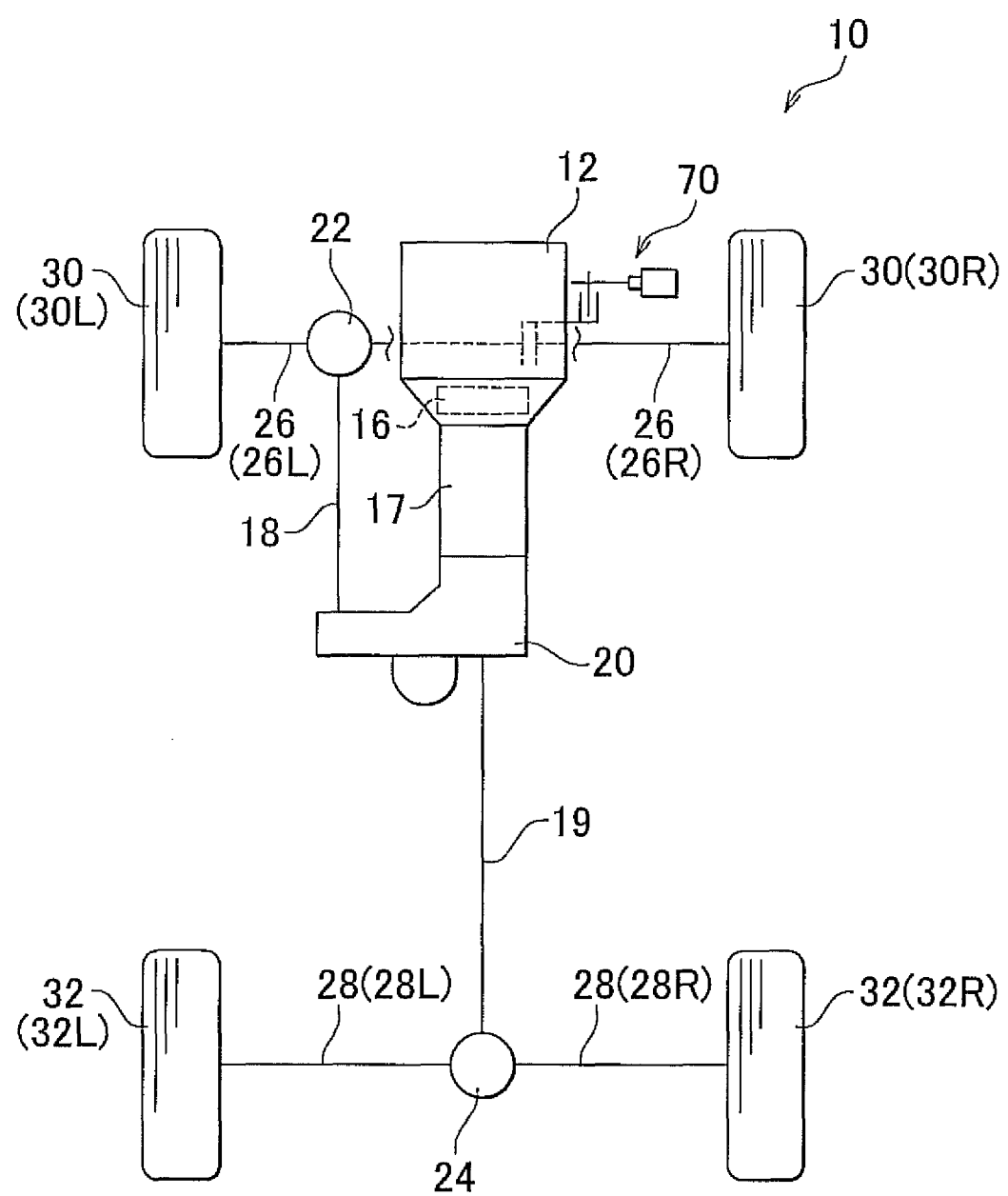
FIG. 1 is a view of a main part of a vehicle to which the front differential for a vehicle of the invention may be applied.

FIG. 1 is a view of a main part of a power transmitting apparatus 10 of a vehicle to which a first example embodiment of the invention has been applied. In FIG. 1, a power transmitting apparatus 10 is designed for a 4WD (four wheel drive) vehicle and includes an engine 12 as a power source for running, a clutch 16, a manual transmission 17, a transfer (i.e., a power distributing apparatus) 20, a front differential gear unit 22, and a rear differential gear unit 24. The clutch 16 interrupts the drive transmission path between the engine 12 and the manual transmission 17 by the depression of a clutch pedal, not shown, provided in front of the driver. This clutch 16 is a dry-operating single disc friction clutch, for example, and is released or applied (i.e., engaged) by a clutch release cylinder that serves as a clutch actuator that operates by hydraulic pressure supplied from a clutch operating apparatus according to the operation amount of the clutch pedal. The manual transmission 17 switches speeds according to a shift operation by a shift lever, not shown, performed while the clutch pedal is being depressed. This manual transmission 17 is a so-called constant (synchronous) mesh parallel shaft manual transmission that is well-known. The transfer 20 is coupled to the output side of that manual transmission 17 and distributes power transmitted from the manual transmission 17 to the front differential gear unit 22 via a front propeller shaft 18, and the rear differential gear unit 24 via a rear propeller shaft 19. The front differential gear unit 22 rotatably drives a pair of left and right front drive shafts 26 while allowing for a difference in rotation between those drive shafts 26. Similarly, the rear differential gear unit 24 rotatably drives a pair of left and right rear drive shafts 28 while allowing for a difference in rotation between those drive shafts 28. In this power transmitting apparatus 10 structured in this way, power generated by the engine 12 is transmitted to a pair of front driving wheels 30 and a pair of rear driving wheels 32 via the clutch 16, the manual transmission 17, the transfer 20, the front differential gear unit 22, the rear differential gear unit 24, the pair of left and right front drive shafts 26, and the pair of left and right rear drive shafts 28, respectively.

Figure 2:
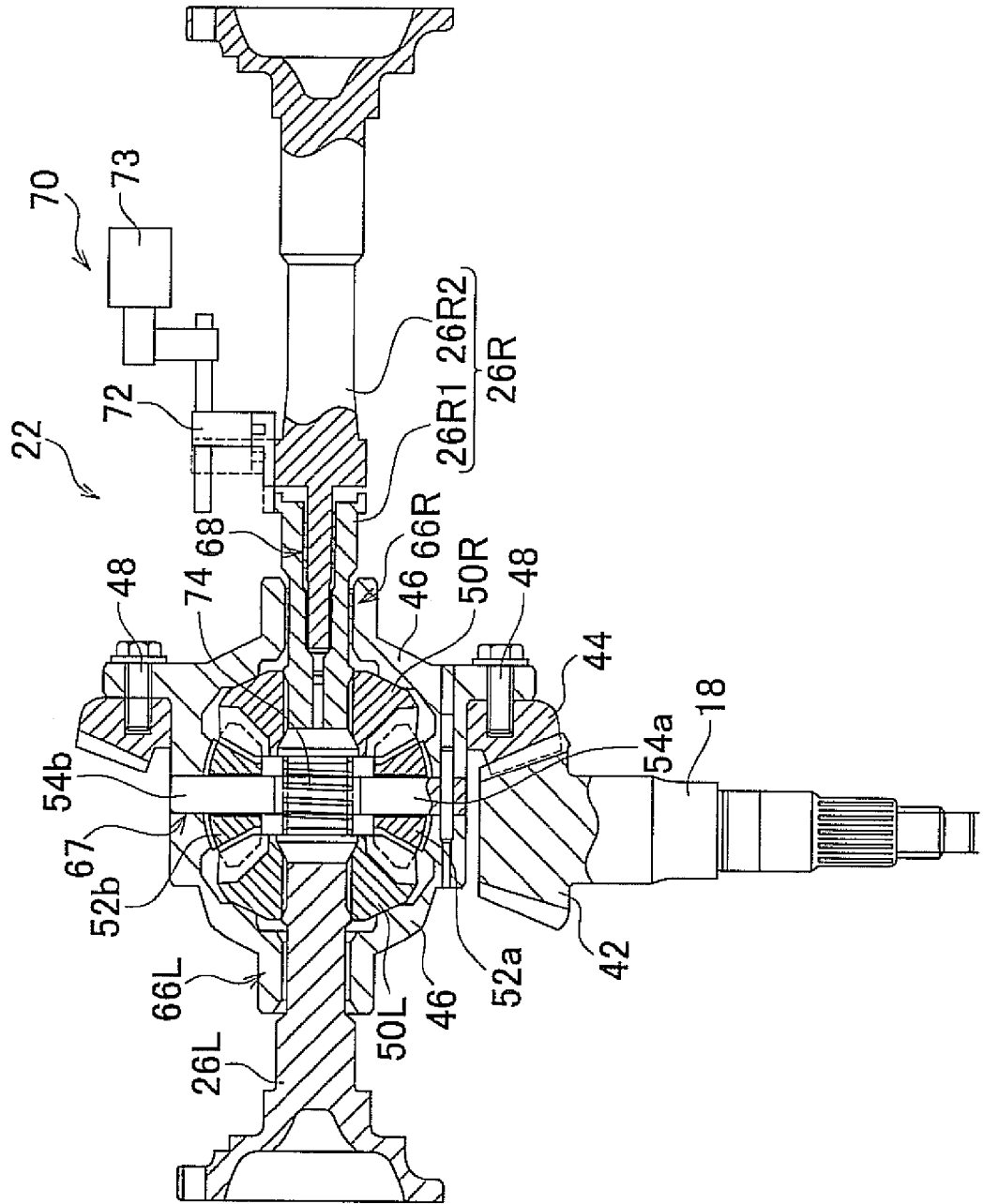
FIG. 2 is a view of the front differential in FIG. 1.

FIG. 2 is a view of the front differential gear unit 22. Power that has been divided by the transfer 20 is input to the front differential gear unit 22 via the front propeller shaft 18. A drive pinion 42 which is a bevel gear is provided on the end portion of the front propeller shaft 18. The teeth of this drive pinion 42 are engaged with the teeth on a ring gear 44 which is also a bevel gear. This bevel gear is, for example, a spiral bevel gear or a hypoid bevel gear in which the teeth are curved. At this time, the front differential gear unit 22 also operates as a final reduction gear according to the reduction gear ratio which is determined by the number of teeth on the drive pinion 42 and the number of teeth on the ring gear 44. This front differential gear unit 22 may correspond to a front differential for a vehicle of the invention.

The ring gear 44 is fixed to a differential case 46 by bolts 48, and rotates (i.e., revolves) together with the differential case 46 about the axis of the front drive shaft 26. This front drive shaft 26 corresponds to a drive shaft of the invention. Incidentally, as will be described later, the front drive shaft 26 includes a first right front drive shaft 26R1, a second right front drive shaft 26R2, and a left front drive shaft 26L. These front drive shafts, i.e., the first right front drive shaft 26R1, the second right front drive shaft 26R2, and the left front drive shaft 26L, are all aligned on the same axis. Also, the differential case 46 may correspond to a differential case of the invention.

A pair of side gears 50R and 50L and a differential pinion gear 52 are arranged within the differential case 46. In this example embodiment, there are two differential pinion gears, i.e., 52a and 52b. The pair of side gears 50R and 50L and the differential pinion gears 52a and 52b are bevel gears, for example. The side gears 50R and 50L are arranged so as to be in mesh with both of the differential pinion gears 52a and 52b.

The differential pinion gear 52a is fitted to a pinion shaft 54a that is rotatably fitted into a fitting hole 67 in the differential case 46 and able to rotate (i.e., spin) about the axis of that pinion shaft 54a. Similarly, and the differential pinion gear 52b is fitted to a pinion shaft 54b that is rotatably fitted into the fitting hole 67 in the differential case 46 and able to rotate (i.e., spin) about the axis of that pinion shaft 54b. Also, the fitting hole 67 of the pinion shafts 54a and 54b rotates as the differential case 46 rotates, so the differential gears 52a and 52b are made to rotate (i.e., revolve) around the front drive shaft 26.

As described above, the side gears 50R and 50L are in mesh with both of the differential gears 52a and 52b. The right front drive shaft 26R for transmitting power to the right front driving wheel 30R is centered on the side gear 50R and coupled to it by spline engagement or the like, such that the side gear 50R and the right front drive shaft 26R rotate together. This right front drive shaft 26R is fitted and supported by a fitting portion 66R such as a needle bearing provided in the differential case 46. Similarly, the left front drive shaft 26L for transmitting power to the left front driving wheel 30L is centered on the side gear 50L and coupled to it by spline engagement or the like, such that the side gear 50L and the left front drive shaft 26L rotate together. This left front drive shaft 26L is fitted and supported by a fitting portion 66L such as a needle bearing provided in the differential case 46. These side gears 50R and 50L may correspond to side gears of the invention. Also, the front driving wheels 30, i.e., the right front driving wheel 30R and the left front driving wheel 30L, may correspond to front wheels of the invention.

In the front differential gear unit 22 structured in this way, when the rotation speeds of the side gears 50R and 50L are the same, the differential pinion gears 52a and 52b are in a non-differential state in which they revolve but do not rotate (i.e., spin). Also, when the rotation speeds of the side gears 50R and 50L are not the same, the differential pinion gears 52a and 52b are in a differential state in which they both revolve and rotate (i.e., spin) according to the rotation speeds of the side gears 50R and 50L.

The right front drive shaft 26R that transmits driving force from the side gear 50R to the right front driving wheel 30R includes a first right drive shaft 26R1 that rotates together with the side gear 50R, and a second right front drive shaft 26R2 that is coupled to the right front driving wheel 30R and rotates together with that right front driving wheel 30R. The first right front drive shaft 26R1 and the second right front drive shaft 26R2 are centered on and connected to a connecting portion 68.

An ADD unit 70 switches between a power transmitting state in which it allows power to be transmitted between the first right front drive shaft 26R1 and the second right front drive shaft 26R2, and a power interrupting state in which it interrupts that transmission of power. More specifically, the ADD unit 70 includes a mesh clutch (i.e., a dog clutch) that selectively couples the first right front drive shaft 26R1 to the second right front drive shaft 26R2, and a motor 73 for switching the operating state of that mesh clutch 72. The operating state of the mesh clutch 72 can be switched between a state in which the first right front drive shaft 26R1 is engaged with the second right front drive shaft 26R2, i.e., a power transmitting state, and a state in which the first right front drive shaft 26R1 is not engaged with the second right front drive shaft 26R2, i.e., a power interrupting state, by driving the motor 73. The mesh clutch 72 indicated by the broken line in FIG. 2 is in a state in which the first right front drive shaft 26R1 is engaged with the second right front drive shaft 26R2. This ADD unit 70 may correspond to a switching mechanism of the invention.

Here, when the ADD unit 70 places the first right front drive shaft 26R1 and the second right front drive shaft 26R2 in the power transmitting state such that power is able to be transmitted therebetween, the driving force that is divided by the transfer 20 is input to the front differential gear unit 22 via the front propeller shaft 18 and transmitted to the left and right front driving wheels 30L and 30R via the left and right front drive shafts 26L and 26R. At this time, the remaining driving force that is divided by the transfer 20 is transmitted to the left and right rear driving wheels 32L and 32R via the rear propeller shaft 19, the rear differential gear unit 24, and the left and right rear drive shafts 28L and 28R, such that the vehicle is in front- and rear-wheel drive (i.e., four wheel drive).

On the other hand, when the ADD unit 70 places the first right front drive shaft 26R1 and the second right front drive shaft 26R2 in the power interrupting state such that power is not able to be transmitted therebetween, the first right front drive shaft 26R1 rotates idly irrespective of the state of the right front drive shaft 30R. At this time, power is not transmitted to the left front drive shaft 26L because of the differential operation of the front differential gear unit 22. Therefore, the driving force that is generated by the engine 12 minus that which is lost due to the drag of the transfer 20 and the front differential gear unit 22 and the like is transmitted to the left and right rear drive shafts 32L and 32R via the rear propeller shaft 19, the rear differential gear unit 24, and the left and right rear drive shafts 28L and 28R, respectively, such that the vehicle is in rear-wheel drive (i.e., two wheel drive).

Incidentally, when the ADD unit 70 places the first right front drive shaft 26R1 and the second right front drive shaft 26R2 in the power transmitting state, that is, when the vehicle is in front- and rear-wheel drive, power (i.e., torque) is transmitted between the differential pinion gears 52a and 52b and the side gears 50R and 50L, so there is a disengaging load on the side gears. The side gear 50R is pushed against the differential case 46 in the axial direction on the right front driving wheel side 30R, and the side gear 50L is pushed against the differential case 46 in the axial direction on the left front driving wheel side 30L. Therefore, the front drive shaft 26R that is coupled to the side gear 50R is supported by the side gear 50R contacting the inner wall surface 60R of the differential case 46 and is also supported by the fitting portion 66R, and the front drive shaft 26L that is coupled to the side gear 50L is supported by the side gear 50L contacting the inner wall surface 60L of the differential case 46 and is also supported by the fitting portion 66L.

On the other hand, when the ADD unit 70 places the first right front drive shaft 26R1 and the second right front drive shaft 26R2 in the power interrupting state, that is, when the vehicle is in rear-wheel drive, power (i.e., torque) is not transmitted between the differential pinion gears 52a and 52b and the side gears 50R and 50L, so there is no disengaging load on the side gears. The front drive shaft 26R is supported only by the fitting portion 66R, and the front drive shaft 26L is supported only by the fitting portion 66L. In this case, the front drive shafts 26R and 26L may lean due to the radial clearance provided for assembling the fitting portions 66R and 66L and the like.

Here, the front drive shaft 26R is coupled to the side gear 50R and the front drive shaft 26L is coupled to the side gear 50L, so these side gears 50R and 50L also lean at the same time the front drive shafts 26R and 26L lean. As a result, the side gears 50R and 50L become out of position such that their rotational centers become offset, i.e., misalignment occurs. If misalignment occurs in the side gears 50R and 50L in this way, the operating vibratory force of the side gears 50R and 50L and the differential pinion gears 52a and 52b becomes worse, and causes abnormal noise and vibration in a differential state in which these side gears 50R and 50L and the differential pinion gears 52a and 52b rotate in mesh with each other.

Therefore, the front differential gear unit 22 of this example embodiment has a spring 74 that urges the side gear 50R toward the outside in the axial direction of the front drive shaft 26R, i.e., toward the front driving wheel 30R, and urges the side gear 50L toward the outside in the axial direction of the front drive shaft 26L, i.e., toward the front driving wheel 30L. This spring 74 is a helical spring, for example, that urges the side gears 50R and 50L in opposite directions. This spring 74 may correspond to an urging mechanism of the invention.

Figure 3:
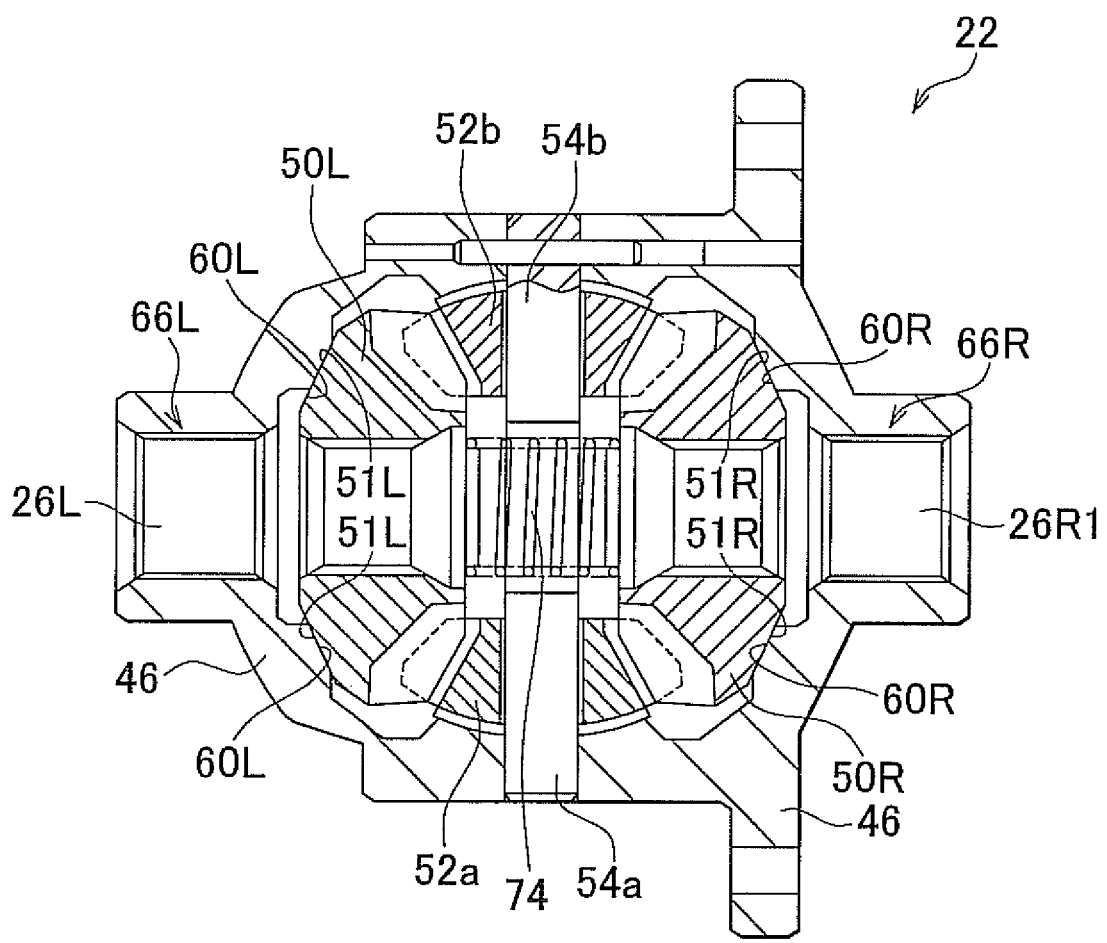
FIG. 3 is an expanded view of FIG. 2, showing the front differential in FIG. 1.

FIG. 3 is an expanded view of the front differential gear unit 22. As shown in FIG. 3, the spring 74 is arranged so that the axis of the spring 74 is the same as the axes of the side gears 50R and 50L. This spring 74 urges the side gears 50R and 50L in opposite directions, i.e., toward front driving wheels 30, that is, toward the outside in the axial direction of the drive shafts 26R and 26L, respectively, such that the side gear 50R abuts against the inner wall surface 60R of the differential case 46, and the side gear 50L abuts against the inner wall surface 60L of the differential case 46. Therefore, even if the vehicle is in rear-wheel drive, i.e., even if the ADD unit 70 places the first right front drive shaft 26R1 and the second right front drive shaft 26R2 in the power interrupting state such that no power (i.e., torque) is transmitted between the differential pinion gears 52a and 52b and the side gears 50R and 50L, the side gears 50R and 50L will not jounce around as much due to misalignment, which enables abnormal noise and vibration with the meshing of the differential pinion gears 52a and 52b to be reduced. Incidentally, the pair of front driving wheels 30, i.e., the front driving wheels 30R and 30L, may correspond to a pair of front wheels of the invention.

Also, as shown in FIG. 3, the inner wall surface 60R of the differential case 46 that the side gear 50R abuts against when the side gear 50R is urged by the spring 74 has a tapered shape in which the diameter becomes smaller toward the outside in the axial direction of the first right front drive shaft 26R1. Similarly, the inner wall surface 60L of the differential case 46 that the side gear 50L abuts against when the side gear 50L is urged by the spring 74 has a tapered shape in which the diameter becomes smaller toward the outside in the axial direction of the left front drive shaft 26L. Also, the tapered shapes of the inner wall surfaces 60R and 60L are shapes that center the side gears 50R and 50L as a result of the side gears 50R and 50L moving according to the taper. Accordingly, when the side gears 50R and 50L are urged by the spring 74, the side gears 50R and 50L move according to the tapered shape formed on the inner wall surfaces 60R and 60L, and thus become centered. As a result, the side gears 50R and 50L will not jounce around as much due to misalignment, which enables abnormal noise and vibration with the meshing of the differential pinion gears 52a and 52b to be reduced.

Furthermore, the inner wall surfaces 60R and 60L of the differential case 46 that the side gears 50R and 50L, respectively, contact when they are urged by the spring 74, as well as the bottom surfaces 51R and 51L of the side gears 50R and 50L, respectively, all undergo a process to reduce friction. Polishing is one specific example of this friction-reducing process which reduces the sliding friction when the two rotate while abutting against one another. The inner wall surface 60R and 60L of the differential case 46 and the bottom surfaces 51R and 51L of the side gears 50R and 50L, respectively, may correspond to contact surfaces of the invention.

When the side gears 50R and 50L are urged by the spring 74, friction occurs between the inner wall surface 60R of the differential case 46 and the bottom surface 51R of the side gear 50R, and also between the inner wall surface 60L of the differential case 46 and the bottom surface 51L of the side gear 50L. This friction inhibits the differential-limiting function, such as that of an LSD (limited-slip differential), of the front differential gear unit 22. In particular, when the differential-limiting function is demonstrated by the front differential gear unit 22, torque steer that works to return the steering wheel to its original position is generated when the steering wheel is turned, which may reduce drivability. The structure described above, however, is able to suppress this.

According to the example embodiment described above, the spring 74 urges the side gear 50R in the axial direction of the front drive shaft 26R1 and the side gear 50L in the axial direction of the front drive shaft 26L. Therefore, even if the vehicle is placed in rear-wheel drive by the ADD unit 70, abnormal noise and vibration in the front differential gear unit 22 are able to be suppressed.

Also, according to the example embodiment described above, when the spring 74 urges the side gear 50R in the axial direction of the front drive shaft 26R1 and the side gear 50L in the axial direction of the front drive shaft 26L, the side gear 50R moves according to the inner wall surface 60R that is tapered such that the diameter decreases toward the outside in the axial direction of the front drive shaft 26R1, and the side gear 50L moves according to the inner wall surface 60L that is tapered such that the diameter decreases toward the outside in the axial direction of the front drive shaft 26L. Therefore, the side gears 50R and 50L are inhibited from becoming misaligned, so abnormal noise and vibration are suppressed even more.

Also, according to the example embodiment described above, in the front differential gear unit 22, the bottom surfaces 51R and 51L of the side gears 50R and 50L, respectively, and the inner wall surfaces 60R and 60L of the differential case 46, which are the contact surfaces of the side gears 50R and 50L and the differential case 46, undergo a friction-reducing process such as polishing. Therefore, friction can be reduced even if the side gears 50R and 50L rotate while in contact with the inner wall surfaces 60R and 60L of the differential case 46, respectively.

Continuing on, other example embodiments of the invention will now be described. In the described below, parts that are common to the example embodiment described above will be denoted by the same reference characters and descriptions of those parts will be omitted.

Figure 4:
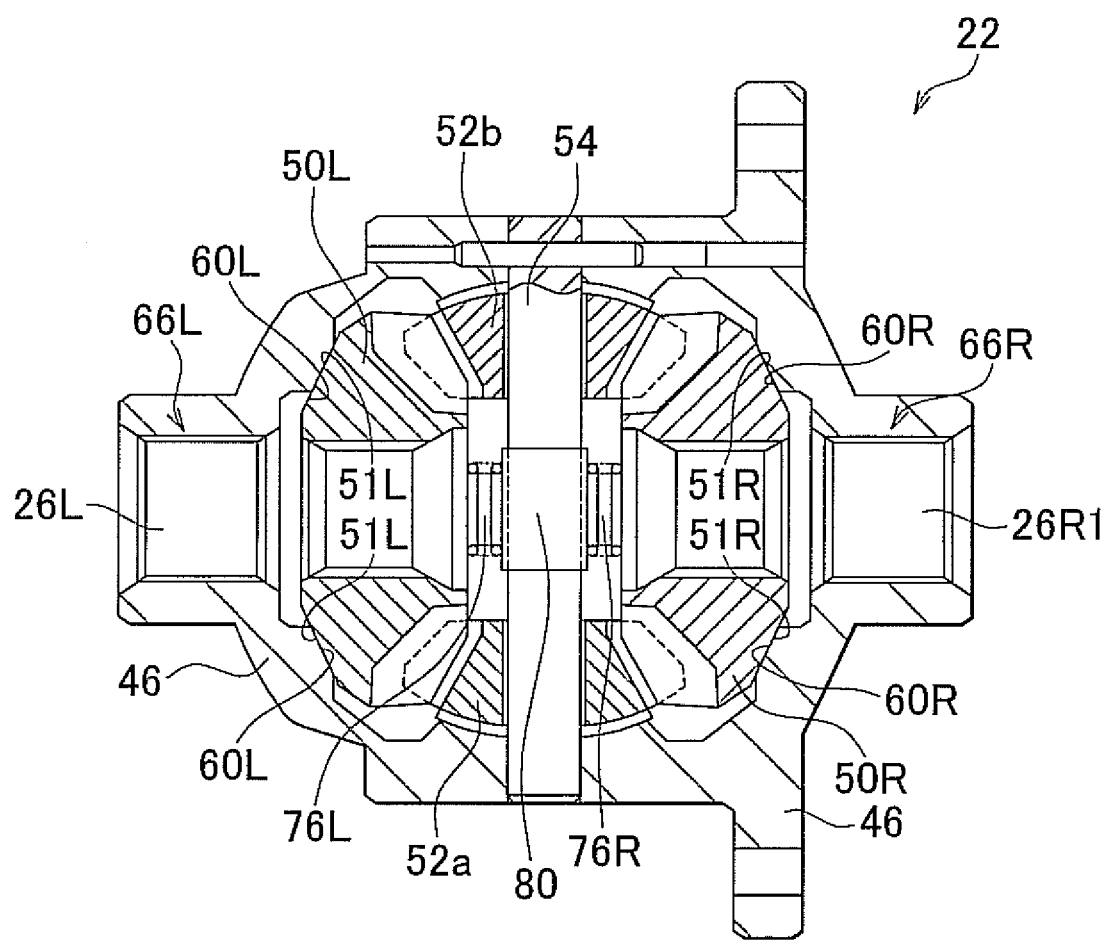
FIG. 4 is a view that corresponds to FIG. 3 and shows the front differential according to another example embodiment of the invention.

FIG. 4 is a view that corresponds to FIG. 3 and shows the front differential gear unit 22 according to a second example embodiment of the invention.

In the example embodiment described above shown in FIG. 3, the differential pinion gear 52a is fitted on the pinion shaft 54a and the differential pinion gear 52b is fitted on the pinion shaft 54b, and the single spring 74 is provided between the side gears 50R and 50L in the space where the two differential pinion gears 52a and 52b face each other inside the front differential gear unit 22. This spring 74 urges the side gear 50R toward the outside in the axial direction of the first right front drive shaft 26R1, and urges the side gear 50L toward the outside in the axial direction of the left front drive shaft 26L.

In this second example embodiment, the two differential pinion gears 52a and 52b are fitted onto a single common pinion shaft 54, as shown in FIG. 4. Also, a spring supporting portion 80 for supporting springs 76R and 76L, which will be described later, is provided near the area where the first right front drive shaft 26R1 and the left front drive shaft 26L of the pinion shaft 54 intersect.

The front differential gear unit 22 of this example embodiment has the spring 76R for urging the side gear 50R toward the outside in the axial direction of the right front drive shaft 26R, and the spring 76L for urging the side gear 50L toward the outside in the axial direction of the left front drive shaft 26L. The spring 76R is arranged between the side gear 50R and the spring supporting portion 80 of the pinion shaft 54, and the spring 76L is arranged between the side gear 50L and the spring supporting portion 80 of the pinion shaft 54. The springs 76L and 76R are arranged such that the axes of the springs 76L and 76R are the same as the axes of the side gears 50R and 50L. As a result, the forces applied by the springs 76R and 76L to the pinion shaft 54 are canceled out, so movement of the pinion shaft 54 from the forces applied by the springs 76R and 76L is suppressed. These springs 76R and 76L are helical springs, for example, which urge the side gears 50R and 50L in opposite directions. In this example embodiment, the springs 76R and 76L may correspond to an urging mechanism of the invention.

The side gear 50R is urged by the spring 76R toward the outside in the axial direction of the right front drive shaft 26R, such that the side gear 50R abuts against the inner wall surface 60R of the differential case 46. Similarly, the side gear 50L is urged by the spring 76L toward the outside in the axial direction of the left front drive shaft 26L, such that the side gear 50L abuts against the inner wall surface 60L of the differential case 46. Therefore, even if the vehicle is in rear-wheel drive, i.e., even if ADD unit 70 places the first right front drive shaft 26R1 and the second right front drive shaft 26R2 in the power interrupting state such that no power (i.e., torque) is transmitted between the differential pinion gears 52a and 52b and the side gears 50R and 50L, the side gears 50R and 50L will not jounce around as much due to misalignment, which enables abnormal noise and vibration with the meshing of the differential pinion gears 52a and 52b to be reduced.

According to the second example embodiment, the side gear 50R is urged by the spring 76R in the axial direction of the right front drive shaft 26R, and the side gear 50L is urged in the axial direction of the left front drive shaft 26L. Therefore, the effect is the same as it is in the first example embodiment. That is, even if the vehicle is placed in rear-wheel drive by the ADD unit 70, abnormal noise and vibration in the front differential gear unit 22 can be suppressed.

Figure 5:
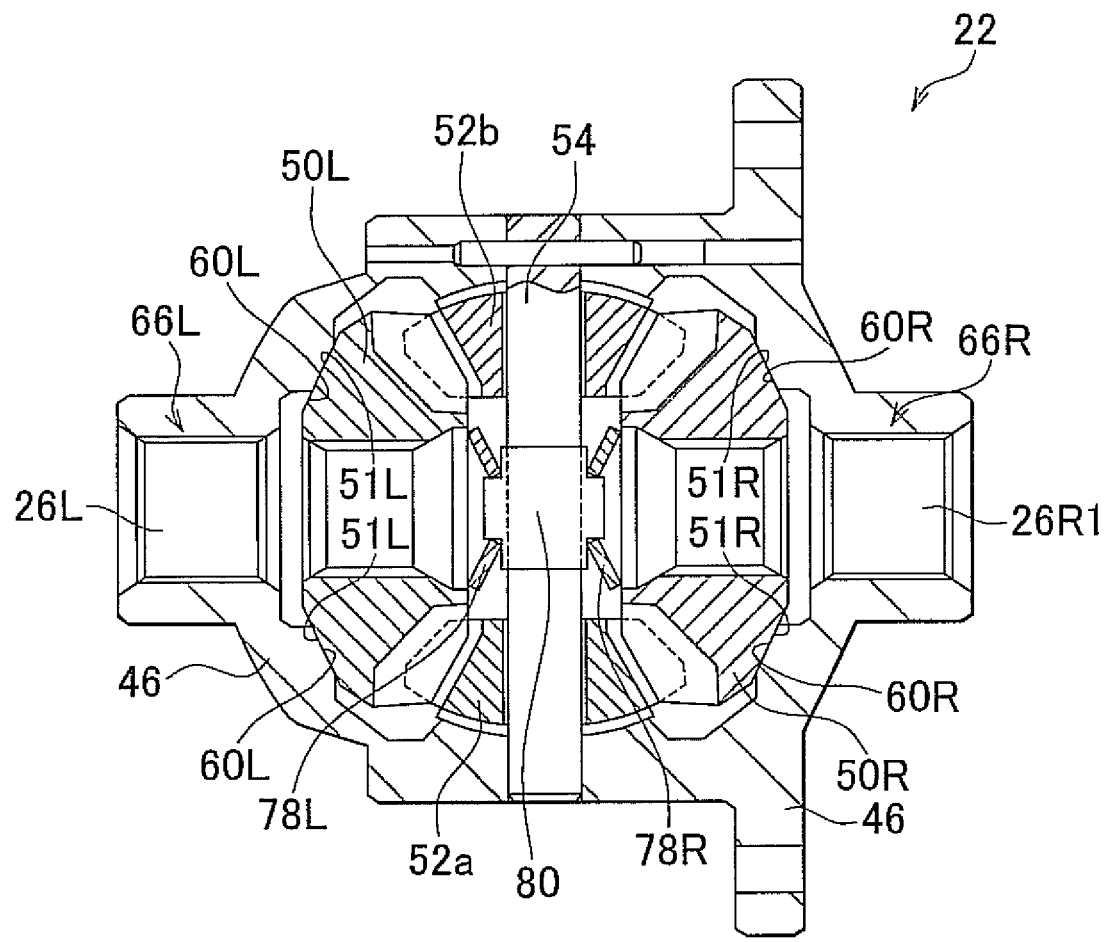
FIG. 5 is a view that corresponds to FIG. 4 and shows the front differential according to yet another example embodiment of the invention.

FIG. 5 is a view that corresponds to FIG. 4 and shows the front differential gear unit 22 according to a third example embodiment of the invention.

This third example embodiment shown in FIG. 5 differs from the second example embodiment shown in FIG. 4 in that disc springs (i.e., tapered springs) 78R and 78L are used instead of the springs 76R and 76L. The third example embodiment also differs from the second example embodiment in that the spring supporting portion 80 provided on the pinion shaft 54 for supporting the disc springs 78R and 78L is shaped so as to be able to support the disc springs 78R and 78L.

That is, the front differential gear unit 22 of this example embodiment has a disc spring 78R for urging the side gear 50R toward the outside in the axial direction of the right front drive shaft 26R, and a disc spring 78L for urging the side gear 50L toward the outside in the axial direction of the left front drive shaft 26L. The disc spring 78R is arranged between the side gear 50R and the spring supporting portion 80 of the pinion shaft 54 so as to have the same axis as the side gear 50R, and the disc spring 78L is arranged between the side gear 50L and the spring supporting portion 80 of the pinion shaft 54 so as to have the same axis as the side gear 50L. These disc springs 78R and 78L urge the side gears 50R and 50L in opposite directions. In this example embodiment, the disc springs 78R and 78L may correspond to an urging mechanism of the invention.

The side gear 50R is urged by the disc spring 78R toward the outside in the axial direction of the right front drive shaft 26R, such that the side gear 50R abuts against the inner wall surface 60R of the differential case 46. Similarly, the side gear 50L is urged by the disc spring 78L toward the outside in the axial direction of the left front drive shaft 26L, such that the side gear 50L abuts against the inner wall surface 60L of the differential case 46. Therefore, even if the vehicle is in rear-wheel drive, i.e., even if ADD unit 70 places the first right front drive shaft 26R1 and the second right front drive shaft 26R2 in the power interrupting state such that no power (i.e., torque) is transmitted between the differential pinion gears 52a and 52b and the side gears 50R and 50L, the side gears 50R and 50L will not jounce around as much due to misalignment, which enables abnormal noise and vibration with the meshing of the differential pinion gears 52a and 52b to be reduced.

According to the example embodiment described above, the side gear 50R is urged in the axial direction of the right front drive shaft 26R by the disc spring 78R, and the side gear 50L is urged in the axial direction of the left front drive shaft 26L by the disc spring 78L. Therefore, the effect is the same as it is in the foregoing example embodiment. That is, even if the vehicle is placed in rear-wheel drive by the ADD unit 70, abnormal noise and vibration in the front differential gear unit 22 can be reduced.

While example embodiments of the invention have been described in detail with reference to the accompanying drawings, the invention may also be carried out in other modes.

For example, in the first example embodiment, the two differential pinion gears 52a and 52b are provided, but the number of the differential pinion gears 52 is not limited to two.

Also, the disc springs 78R and 78L in the third example embodiment described above are not limited to the shapes shown in FIG. 5. For example, a plurality of disc springs may be laid on top of one another.

Further, in the example embodiments described above, the vehicle is switched between front- and rear-wheel drive and rear-wheel drive by using the ADD unit 70 to switch between a state in which power is transmitted between the first right front drive shaft 26R1 and the second right front drive shaft 26R2 and a state in which the transmission of power between the first right front drive shaft 26R1 and the second right front drive shaft 26R2 is interrupted. However, the invention is not limited to this. For example, the vehicle may be switched to rear-wheel drive by placing the ADD unit 70 in a state that interrupts the transmission of power between the first right front drive shaft 26R1 and the second right front drive shaft 26R2, and interrupting the transmission of power from the transfer 20 to the front propeller shaft 18 by controlling the transfer 20. As a result, drag from the transfer 20 when the vehicle is in rear-wheel drive can be reduced.

Also, in the example embodiments described above, the inner wall surfaces 60R and 60L of the differential case 46 and the bottom surfaces 51R and 51L of the side gears 50R and 50L, which abut against each other when the side gears 50R and 50L are urged by the spring 74 or the springs 76R and 76L or 78R and 78L, are polished in order to reduce friction. However, the invention is not limited to this. For example, a low μ coating such as DLC (diamond-like carbon) may be applied. That is, the same effect can be obtained by a process that reduces friction by increasing the hardness of the inner wall surfaces 60R and 60L of the differential case 46 and the bottom surfaces 51R and 51L of the side gears 50R and 50L, which are the contact surfaces.

Further, in the second and third example embodiments described above, the spring 76R or the disc spring 78R is provided for urging the side gear 50R, and the spring 76L or the disc spring 78L is provided for urging the side gear 50L, but the invention is not limited to this. For example, in order to urge only the side gear on the side where abnormal noise, such as gear grinding noise, and vibration tend to occur, from among the pair of side gears 50R and 50L, it is also effective to a certain degree to provide only the spring or disc spring that urges that side gear where the abnormal noise and vibration tend to occur. More specifically, in the example embodiments described above, the first right front drive shaft 26R1 is made to rotate idly by the ADD unit 70, so only the spring 76R or the disc spring 78R that urges the side gear 50R that is coupled to that idly rotating first right front drive shaft 26R1 may be provided.

Also in the foregoing example embodiments, the power transmitting apparatus 10 has the manual transmission 17 for performing a shift and the clutch 16 that selectively inputs power to this manual transmission 17 between the engine 12 and the transfer 20. However, the invention is not limited to this. For example, a well-known automatic transmission and a fluid coupling such as a torque converter may be used instead of the manual transmission 17 and the clutch 16.

In the front differential of the invention, the contact surfaces of the side gears and the differential case may also be tapered so that the diameters decrease toward the outside in the axial direction of the drive shaft. According to this structure, when the side gears are urged in the axial direction of the drive shaft by the urging mechanism, they will move according to the tapered contact surfaces and therefore be inhibited from becoming misaligned, such that abnormal noise and vibration can be suppressed even more.

Also, in the front differential of the invention, the contact surfaces of the side gears and the differential case may also be processed to reduce friction. According to this structure, friction can be reduced even when the side gears are rotated while being urged against the contact surfaces by the urging mechanism.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A front differential for a four wheel drive vehicle, comprising:
   a differential case having a tapered inner wall contact surface;
   a switching mechanism that switches the vehicle between rear-wheel drive and front- and rear-wheel drive by selectively interrupting or allowing the transmission of power between one of a pair of side gears and one of a pair of front wheels, each one of the pair of side gears having a tapered contact surface; and
   an urging mechanism disposed within the differential case, the urging mechanism urges at least one of the pair of side gears in a drive shaft axial direction toward at least one of the front wheels;
   wherein the urging mechanism urges at least one of the tapered contact surfaces of the pair of side gears against the tapered inner wall contact surface of the differential case, the tapered contact surfaces of the pair of side gears and the tapered inner wall contact surface of the differential case are processed to reduce friction.

2. The front differential according to claim 1, wherein the urging mechanism urges the one of the pair of side gears toward the one of the pair of front wheels, or urges the other of the pair of side gears toward the other of the pair of front wheels.

3. The front differential according to claim 1, wherein:
   the urging mechanism urges the one of the pair of side gears toward the one of the pair of front wheels; and
   the urging mechanism urges the other of the pair of side gears toward the other of the pair of front wheels.

4. The front differential according to claim 1, wherein the tapered contact surfaces of the pair of side gears and the tapered inner wall contact surface of the differential case are tapered such that a diameter decreases toward an outside in the drive shaft axial direction.

5. The front differential according to claim 1, wherein the tapered contact surfaces of the pair of side gears and the tapered inner wall contact surface of the differential case are tapered such that a diameter decreases toward an outside in the drive shaft axial direction.

6. The front differential according to claim 1, wherein the urging mechanism is a spring.

7. The front differential according to claim 6, wherein the spring is a single spring that is arranged between the pair of side gears.

8. The front differential according to claim 7, wherein the spring is arranged such that the axis thereof is the same as the axes of the pair of side gears.

9. The front differential according to claim 6, further comprising:
   a pair of differential pinion gears; and
   a pinion shaft onto which the pair of differential pinion gears are commonly fitted,
   wherein the pinion shaft has a spring supporting portion for supporting the spring; and
   wherein the spring includes a pair of springs that are positioned between the pair of side gears and the spring supporting portion.

10. The front differential according to claim 9, wherein the pair of springs are arranged such that the axes of the pair of springs are the same as the axes of the pair of side gears.

11. The front differential according to claim 1, wherein the urging mechanism is a disc spring.

12. The front differential according to claim 11, further comprising:
   a pair of differential pinion gears; and
   a pinion shaft onto which the pair of differential pinion gears are commonly fitted,
   wherein the pinion shaft has a spring supporting portion for supporting the disc spring; and
   wherein the disc spring includes a pair of disc springs that are positioned between the pair of side gears and the spring supporting portion.

13. The front differential according to claim 1, wherein the tapered contact surfaces of the pair of side gears and the tapered inner wall contact surface of the differential case are coated with a low μ coating.

14. A front differential for a four wheel drive vehicle, comprising:
   a differential case having a tapered inner wall contact surface;
   a switching mechanism that switches the vehicle between rear-wheel drive and front- and rear-wheel drive by selectively interrupting or allowing the transmission of power between one of a pair of side gears and one of a pair of front wheels, each one of the pair of side gears having a tapered contact surface; and
   an urging mechanism disposed within the differential case, the urging mechanism urges at least one of the tapered contact surfaces of the pair of side gears in a drive shaft axial direction to the tapered inner wall surface of the differential case toward a front wheel that corresponds to the respective side gear;
   wherein the tapered contact surfaces of the pair of side gears and the tapered inner wall contact surface of the differential case are processed to reduce friction.

\* \* \* \* \*